ପ୍

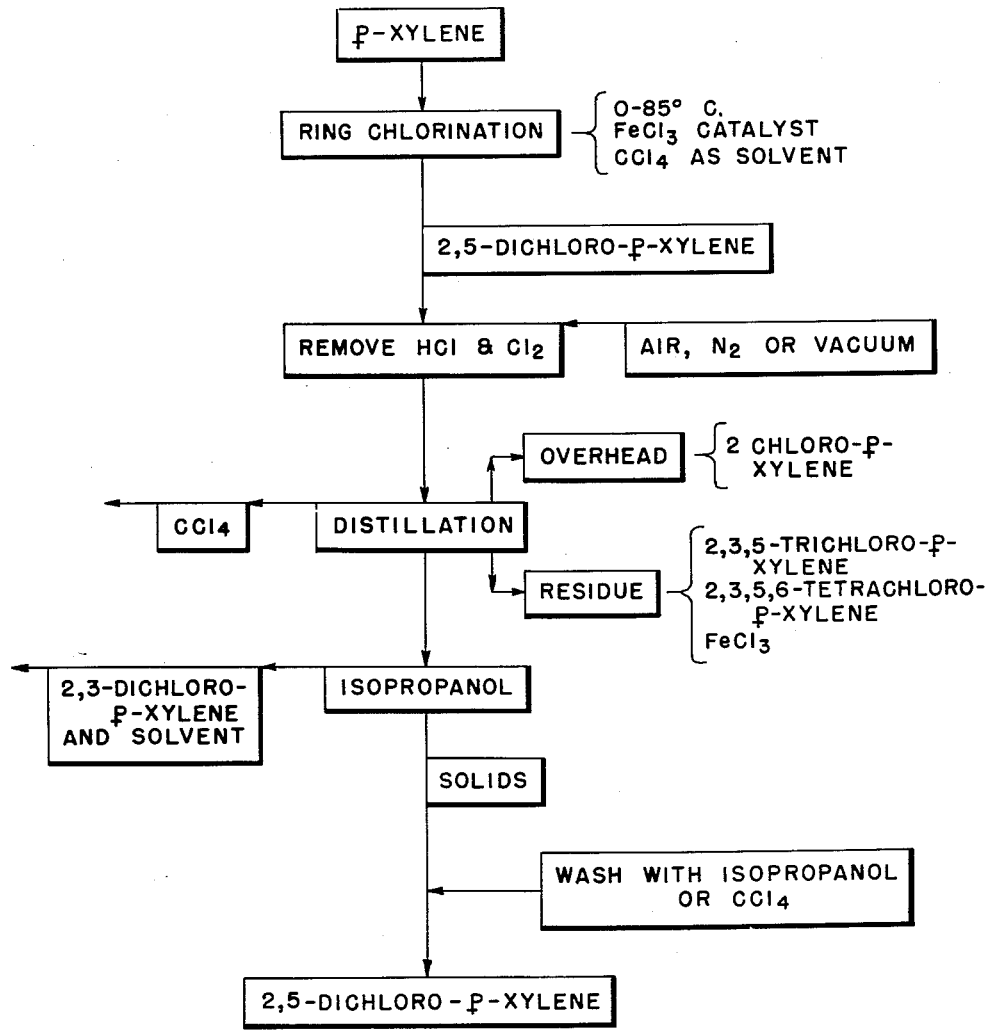

United States Patent Office 3,035,103
Patented May 15, 1962

3,035,103
PROCESS FOR PREPARATION AND RECOVERY OF 2,5-DICHLORO-p-XYLENE
Alex Hlynsky, Painesville, Ohio, assignor to Diamond Alkali Company, Cleveland, Ohio, a corporation of Delaware
Filed Sept. 16, 1959, Ser. No. 840,426
4 Claims. (Cl. 260—650)

This invention relates to a new and improved method of preparing and isolating 2,5-dichloro-p-xylene.

The process of this invention comprises chlorinating p-xylene to form and isolate 2,5-dichloro-p-xylene and separating this product from lower and higher chlorinated components of the reaction mixture, as by distillation, contacting it with a larger volume of a lower alkanol substantially incapable of dissolving it while dissolving the other remaining chlorinated xylene products; thereby effecting a clean and easy separation of the desired product. The expression "lower alkanol" as used in the specification and claims is intended to refer to various lower mono and polyhydroxy alkanols containing up to about nine carbon atoms, e.g., methanol, ethanol, isopropanol, butanol, pentanol, and the like, isopropanol being preferred.

More specifically, the practice of the present invention comprises chemically reacting in the presence of a solvent, preferably carbon tetrachloride, p-xylene and chlorine in a ratio between about 1.85 to 2.10 mol. of chlorine to 1 mol. of xylene, preferably 2 mol. of chlorine to each mol. of xylene, in the presence of up to about 2%, e.g., about 0.1 to 2%, of ferric chloride, preferably 1%, at a temperature preferably within the range from about 20° to 30° C., inclusive.

The reaction is exothermic and desirably is carried out at a lower temperature. However, the chlorination may be carried out with a higher temperature, e.g., up to about 85° C. The crude chlorination mixture, typically comprising about 10 to 16% by weight of 2-chloro-p-xylene, 50 to 67% by weight of 2,5-dichloro-p-xylene, 17 to 28% by weight of 2,3-dichloro-p-xylene, 5 to 10% by weight of 2,3,5-trichloro-p-xylene and 3 to 5% by weight of 2,3,5,6-tetrachloro-p-xylene, is then blown with air or nitrogen, or subjected to vacuum treatment, to remove excess hydrogen chloride and chlorine.

The crude reaction mixture is then distilled first to remove the 2-chloro-p-xylene; a dichloro cut at about 220° to 230° C. at atmospheric pressure consisting of 2,5-dichloro-p-xylene and 2,3-dichloro-p-xylene is then separated. The distillation residue contains the chlorination catalyst and the 2,3,5-trichloro-p-xylene and 2,3,5,6-tetrachloro-p-xylene. The dichloro mixture is then contacted with a lower alkanol, preferably isopropanol. In the lower alkanol, 2,5-dichloro-p-xylene is substantially insoluble while 2,3-dichloro-p-xylene is completely dissolved. In this connection, it will be appreciated that solubilities differ somewhat and that different alkanols are not necessary quantitive equivalents in the practice of this invention.

A preferred practice of the present invention comprises carrying out the chlorination step as indicated and distilling the crude chlorination product either at atmospheric or reduced pressure. At atmospheric pressure, 2-chloro-p-xylene product distills over at about 183° to 185° C., the desired 2,5-dichloro-p-xylene-containing fraction distilling at about 220° to 230° C., the higher ring chlorinated products and the chlorination catalyst remaining as still residues, 2,5-dichloro-p-xylene-containing fraction being distilled directly into a lower alkanol, preferably isopropanol. By distillation directly into isopropanol the 2,5-dichloro-p-xylene precipitates out because it is insoluble in isopropanol, while the other ring chlorinated xylene products dissolve, thereby effecting a clean, easy separation. During the distillation, the hot distillation fraction generally heats the isopropanol to reflux, on cooling, the product is precipitated and is washed with either isopropanol or carbon tetrachloride to obtain a high yield of the desired pure product.

Referring to the accompanying drawing, it will be observed that p-xylene is chlorinated at a temperature from 0° to 85° C. using ferric chloride as a catalyst and the crude reaction mixture treated to remove hydrogen chloride and excess chlorine. This product is then distilled and the 2,5-dichloro-p-xylene-containing material can be contacted with isopropanol directly in order to effect the desired separation. Otherwise, the crude mixture is distilled directly into isopropanol as indicated. The solid 2,5-dichloro-p-xylene obtained from the isopropanol treatment can be washed, if desired, with isopropanol or carbon tetrachloride to obtain the final pure product melting at 72° C.

In order that those skilled in the art may more completely understand the present invention and the preferred methods by which the same may be carried into effect, the following specific examples may be offered:

Example 1

Using a three-necked, round bottom glass flask equipped with a thermometer, chlorine sparger and agitator are introduced one mol of p-xylene and 1% by weight of ferric chloride. Into this mixture with agitation is gradually introduced 2 mol of chlorine gas. Light is excluded. The resultant mixture contains about 10–16% by weight of 2-chloro-p-xylene, 50–67% by weight of 2,5-dichloro-p-xylene, 17–28% by weight of 2,3-dichloro-p-xylene, 5–10% by weight of 2,3,5-trichloro-p-xylene and 3–5% by weight of 2,3,5,6-tetrachloro-p-xylene. The boiling points and melting points of these fractions are as follows:

| Compound | Boiling point (° C.) | Melting point (° C.) |
| --- | --- | --- |
| 2-chloro-p-xylene | 186 | 2 |
| 2,5-dichloro-p-xylene | 224 | 72 |
| 2,3-dichloro-p-xylene | 230 | −2 |
| 2,3,5-trichloro-p-xylene | 263 | 91 |
| 2,3,5,6-tetrachloro-p-xylene | >270 | 223 |

The thus-obtained crude chlorination mixture is distilled at atmospheric pressure and a dichloro-p-xylene fraction is taken as the material distilling over between 220° and 230° C. Hence, it will be appreciated that the 2-chloro-p-xylene is removed as an overhead product, while the 2,3,5-trichloro-p-xylene and 2,3,5,6-tetrachloro-p-xylene remain in the distillation flask along with the originally used catalyst so that no further catalyst removal is necessary.

The distillation is carried out such that the fraction taken as the dichloro cut is distilled directly into isopropanol in a volume of about 5–10 times the volume of the product expected. The 2,3-dichloro-p-xylene distills over with the 2,5-dichloro-p-xylene, but the 2,3-dichloro-p-xylene is substantially completely soluble in isopropanol at the temperature involved, while the 2,5-dichloro-p-xylene is substantially insoluble. Accordingly, it will be appreciated that a substantially pure 2,5-dichloro-p-xylene is obtained as a solid product.

Example 2

The procedure of the preceding example is repeated except that the distillation product of between 220° and 230° C. is collected and cooled and then recrystallized from about 5–10 times its volume of isopropanol to obtain a substantially pure 2,5-dichloro-p-xylene as a solid product melting at 72° C.

*Example 3*

The procedure of the preceding two examples is repeated using as other alkanols, respectively, methanol, ethanol, N-propanol and N-butanol. Substantially equivalent results are obtained in each instance having due regard to the slightly different solubilities of the various ring chlorinated xylenes.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing 2,5-dichloro-p-xylene which comprises chlorinating p-xylene, separating the dichlorinated portion containing 2,5-dichloro-p-xylene from the lower and higher chlorinated p-xylenes, contacting the thus separated dichlorinated portion with a lower alkanol selected from the group consisting of isopropanol, methanol, ethanol, N-propanol and N-butanol, at a temperature such that ring-chlorinated xylenes other than 2,5-dichloro-p-xylene will dissolve and thereafter separating the desired product.

2. The method of claim 1 wherein the lower alkanol is isopropanol and the amount of isopropanol is equal to about 5 to 10 times the volume of 2,5-dichloro-p-xylene present.

3. The method of claim 2 wherein the 2,5-dichloro-p-xylene containing portion is distilled directly into the isopropanol, the isopropanol solution containing the dichlorinated xylene is cooled sufficiently to precipitate the 2,5-dichloro-p-xylene and the desired product is separated.

4. The method of preparing 2,5-dichloro-p-xylene which comprises chlorinating p-xylene, distilling the chlorinated p-xylene, separating the dichlorinated xylene portion containing 2,5-dichloro-p-xylene, said portion distilling at a temperature in the range of 220° to 230° C., contacting the dichlorinated portion with an amount of isopropanol equal to about 5 to 10 times the volume of 2,5-dichloro-p-xylene present and lowering the temperature of the isopropanol to crystal out the desired 2,5-dichloro-p-xylene.

References Cited in the file of this patent

Beilstein: Hauptwerk, Band V, p. 384.